US012568929B2

(12) United States Patent
Sakr

(10) Patent No.: US 12,568,929 B2
(45) Date of Patent: Mar. 10, 2026

(54) PET BED WITH COVER COMPRISING AN INTERNAL PARTITION FOR SEPARATING A BASE CUSHION FROM A TOP CUSHION

(71) Applicant: Cat St Pty Ltd, Bondi Beach (AU)

(72) Inventor: Otra Julia Sakr, Bondi Beach (AU)

(73) Assignee: CAT ST PTY LTD, Bondi Beach (AU)

( * ) Notice: Subject to any disclaimer, the term of this patent is extended or adjusted under 35 U.S.C. 154(b) by 0 days.

(21) Appl. No.: 18/603,364

(22) Filed: Mar. 13, 2024

(65) Prior Publication Data

US 2024/0306599 A1     Sep. 19, 2024

(30) Foreign Application Priority Data

Mar. 15, 2023   (AU) ................................. 2023900700

(51) Int. Cl.
*A01K 1/035*          (2006.01)
(52) U.S. Cl.
CPC .................................. *A01K 1/0353* (2013.01)
(58) Field of Classification Search
CPC .................................................... A01K 1/0353
See application file for complete search history.

(56) References Cited

U.S. PATENT DOCUMENTS 3,902,456 A  *  9/1975  David ................... A01K 1/0353
                                                            D6/601
5,010,843 A  *  4/1991  Henry .................. A01K 1/0353
                                                            119/28.5

5,765,502 A  *  6/1998  Haugh ................. A01K 1/0353
                                                            119/28.5
6,508,200 B1 *  1/2003  Remis .................. A01K 1/0353
                                                            119/28.5
2005/0224000 A1   10/2005  Holte
2013/0247828 A1*  9/2013  Tedaldi ............... A01K 1/0353
                                                            119/28.5
2014/0190417 A1   7/2014  Lipscomb et al.
2017/0118950 A1*  5/2017  Xu .......................... E04H 15/18
2020/0315131 A1   10/2020  Bullock et al.
2022/0192147 A1   6/2022  Chitnis

OTHER PUBLICATIONS

Frisco_Faux_Suede_Orthopedic_Bolster_Cat_Dog_Bed_with_
Removable_Cover_Gray_Large_-_Chewy.com (2020).*
Australian Search Report in priority Australian Application No. 2023900700 mailed on Oct. 20, 2023, 19 pages.

* cited by examiner

*Primary Examiner* — Jessica B Wong
(74) *Attorney, Agent, or Firm* — INNOVATION CAPITAL LAW GROUP, LLP; Vic Lin

(57)          ABSTRACT

A bed for a pet, the bed including a base cushion and a top cushion releasably retained within a cover, the cover having an internal partition for separating the base cushion and the top cushion; wherein the top cushion comprises a passage therethrough for receiving the internal partition which attaches to a periphery of an internal surface of the cover thereby locating the top cushion centrally and coaxially with the base cushion within the cover.

18 Claims, 4 Drawing Sheets

PET BED WITH COVER COMPRISING AN INTERNAL PARTITION FOR SEPARATING A BASE CUSHION FROM A TOP CUSHION

CROSS REFERENCE TO RELATED APPLICATIONS

The present application claims priority to Australian Patent Application No. 2023900700, filed Mar. 15, 2023, the disclosure of which is hereby incorporated by reference in its entirety.

TECHNICAL FIELD

The present invention relates to a bed for a pet.

BACKGROUND

Any references to methods, apparatus or documents of the prior art are not to be taken as constituting any evidence or admission that they formed, or form part of the common general knowledge.

Many pet owners allow their pets to live and sleep in the house. Pets inevitably tend to track in all manner of dirt and debris. Such dirt and debris over time can build up and cause unpleasant smells, particularly around their sleeping quarters.

Many pet beds are known. The cushioning in many pet beds comprise microbeads, foams and/or layers of cushioning materials. However, the ability to routinely clean them and reassemble them into their original shape can be problematic. As such, the lifecycle of pet beds may be dramatically reduced and/or pet owners may delay cleaning their pet's bed due to its difficulty.

SUMMARY OF INVENTION

In an aspect, the invention provides a bed for a pet, the bed comprising: a base cushion and a top cushion releasably retained within a cover, the cover having an internal partition for separating the base cushion and the top cushion; wherein the top cushion comprises a passage therethrough for receiving the internal partition which attaches to a periphery of an internal surface of the cover thereby locating the top cushion centrally and coaxially with the base cushion within the cover.

In an embodiment, the top cushion comprises a memory foam coupled to a core cushion within a sleeve.

In an embodiment, the top cushion is substantially toroidal.

In an embodiment, the engagement of the top cushion and the cover defines a nest for receiving a pet.

In an embodiment, the cover comprises one or more zipper assemblies for retaining each of the top cushion and the base cushion in their respective positions.

In an embodiment, the one or more zipper assemblies are associated with the cover and a flap of the cover.

In an embodiment, the cover and the internal partition comprise the same material.

In an embodiment, the cover and the internal partition comprise different materials.

In an embodiment, the cover and/or the internal partition may comprise a water resistant or waterproof material.

In an embodiment, the cover and/or the internal partition may comprise an absorbent material.

In an embodiment, the base cushion and/or the top cushion comprises a secondary cover.

In an embodiment, the secondary covers comprise water resistant or waterproof material.

In another aspect, the invention provides a method of assembling a bed for a pet, the method comprising: providing a cover having a flap for retaining a top cushion and a base cushion having a passage therethrough, the cover also having an internal partition for separating the base cushion and the top cushion; locating the top cushion within the cover such that the internal partition is positioned within the passage; pulling an end of the internal partition through the passage and laying the end of the internal partition adjacent a periphery of an internal surface of the cover; fastening the end of the internal partition to the periphery of the internal surface of the cover; locating the base cushion within the cover abutting the internal partition; fastening the flap of the cover to the cover so as to retain the base cushion and top cushion therein.

In an embodiment, fastening the partition comprises engagement of one or more zipper assemblies.

In an embodiment, fastening the flap comprises engagement of one or more zipper assemblies.

In another aspect, the invention provides a method of disassembling a pet bed, the method comprising: providing a cover having a flap for retaining a top cushion and a base cushion having a passage therethrough, the cover also having an internal partition for separating the base cushion and the top cushion; unfastening the flap of the cover to expose the base cushion; separating the base cushion from the cover; unfastening the internal partition from an internal surface of the cover to expose the top cushion; separating the top cushion from the cover.

In an embodiment, unfastening the partition by disengagement of one or more zipper assemblies.

In an embodiment, unfastening the flap by disengagement of one or more zipper assemblies.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

FIGS. 1 to 8 illustrates a bed 10 for a pet according to an embodiment of the invention from fully assembled to disassembled.

Figure 1:
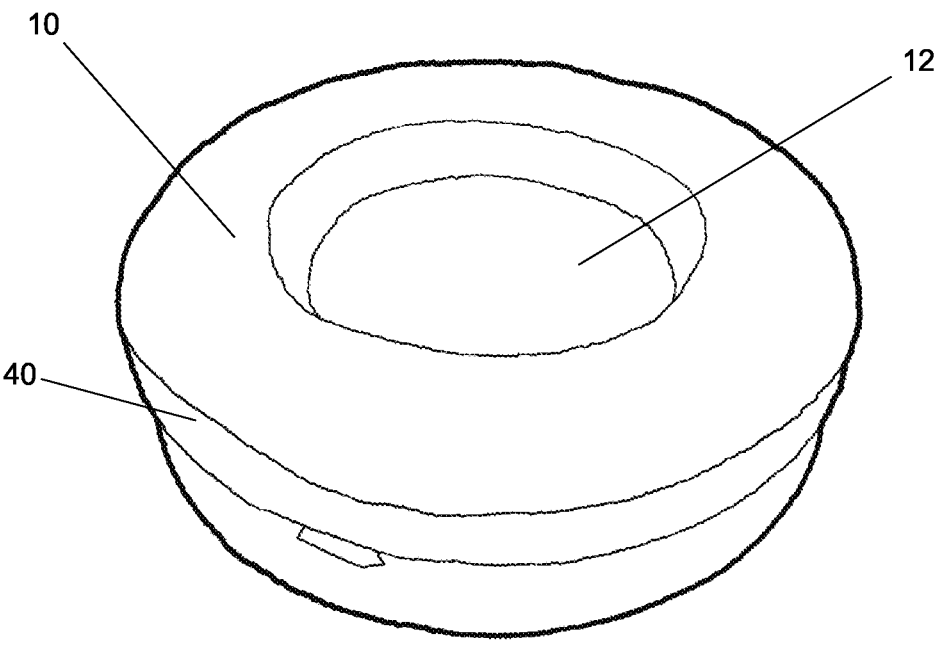
FIG. 1 is an isometric view of a bed for a pet according to an embodiment of the present invention.
Figure 2:
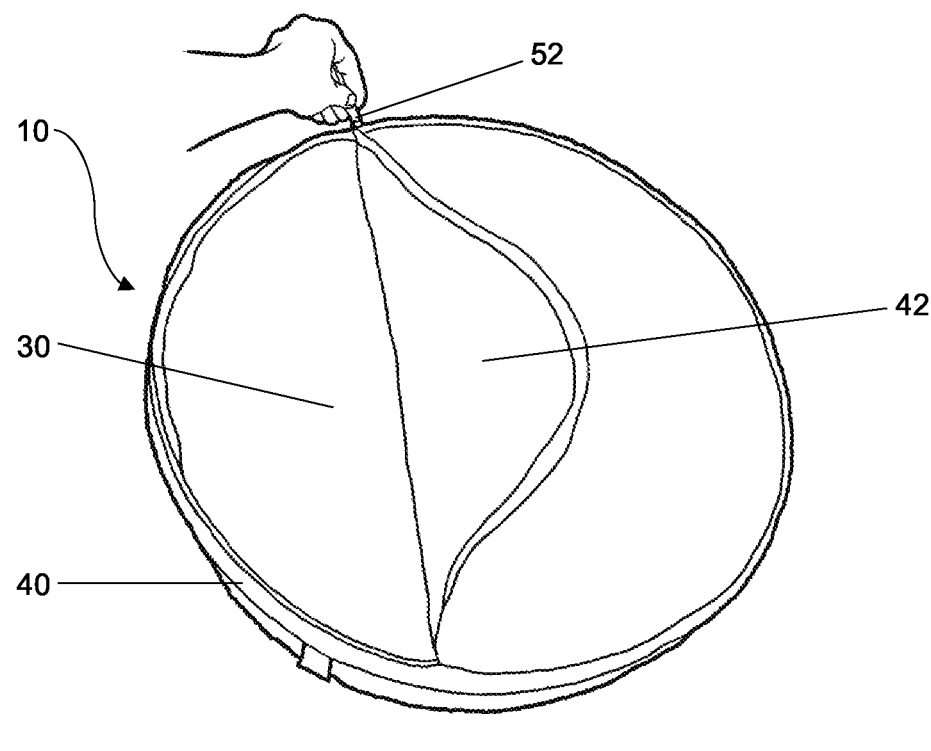
FIG. 2 is an isometric view of the bed of FIG. 1 having the bottom flap unzipped.
Figures 3, 4:
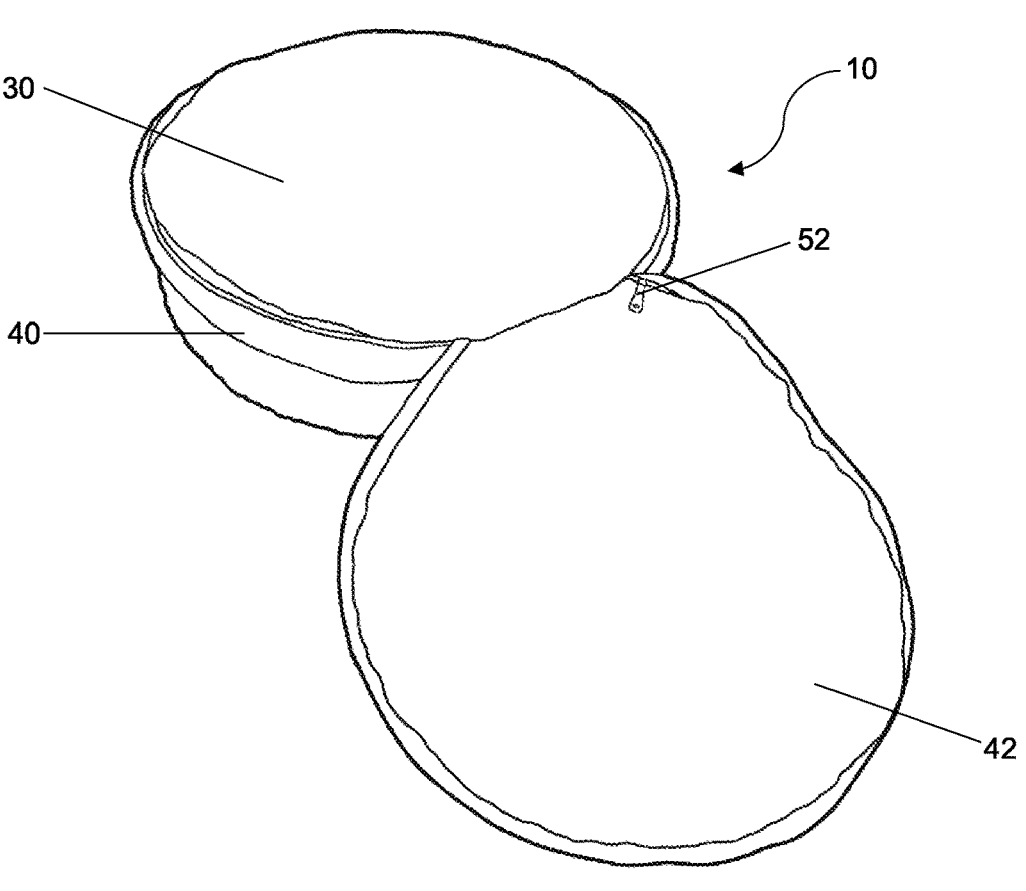
FIG. 3 is an isometric view of the bed of FIG. 1 having the base cushion exposed.
FIG. 4 is an isometric view of the bed of FIG. 1 having the base cushion separated.
Figure 5:
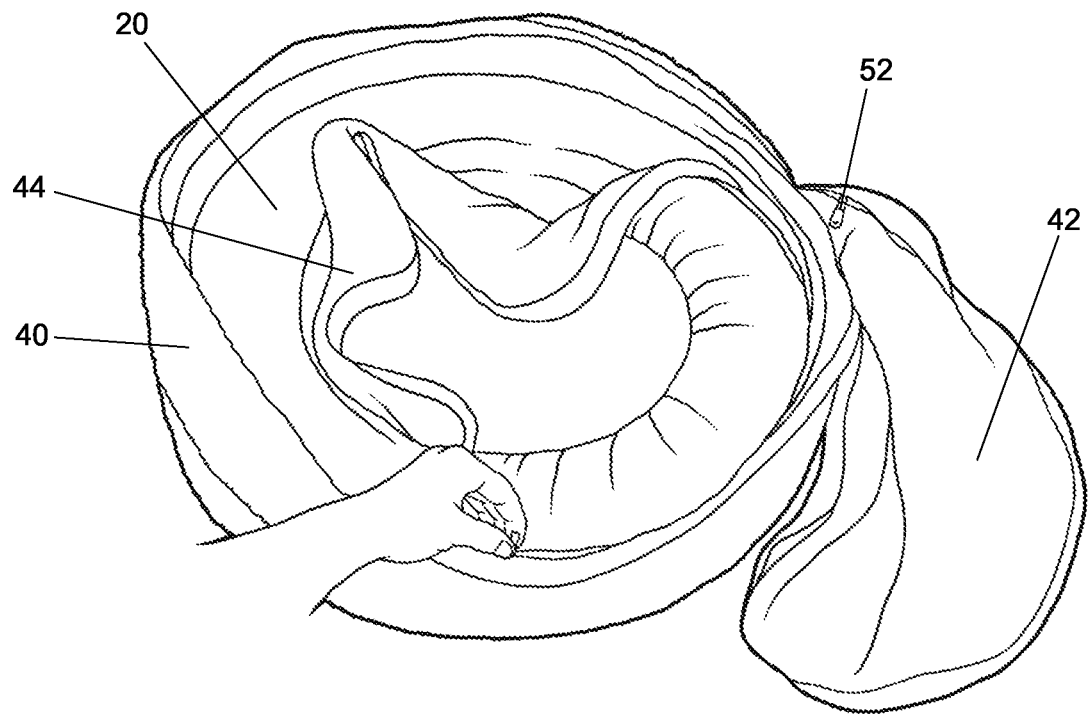
FIG. 5 is an isometric view of the bed of FIG. 1 with the internal partition being unzipped.
Figure 6:
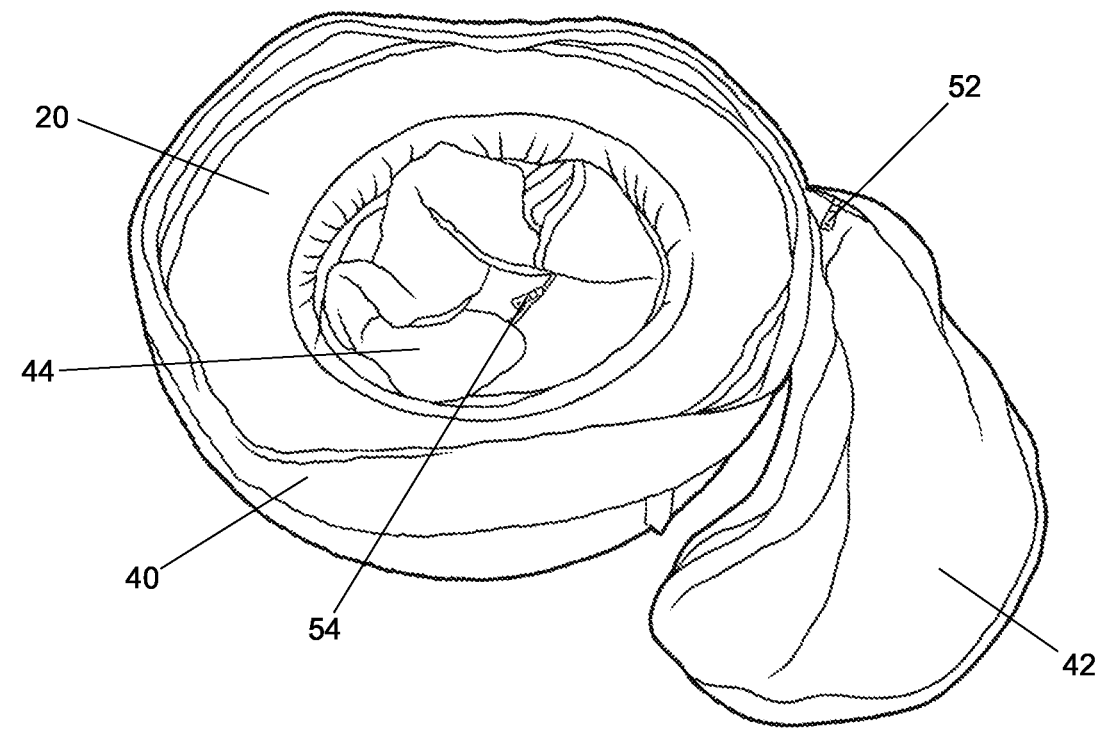
FIG. 6 is an isometric view of the bed of FIG. 1 having the top cushion exposed.
Figure 7:
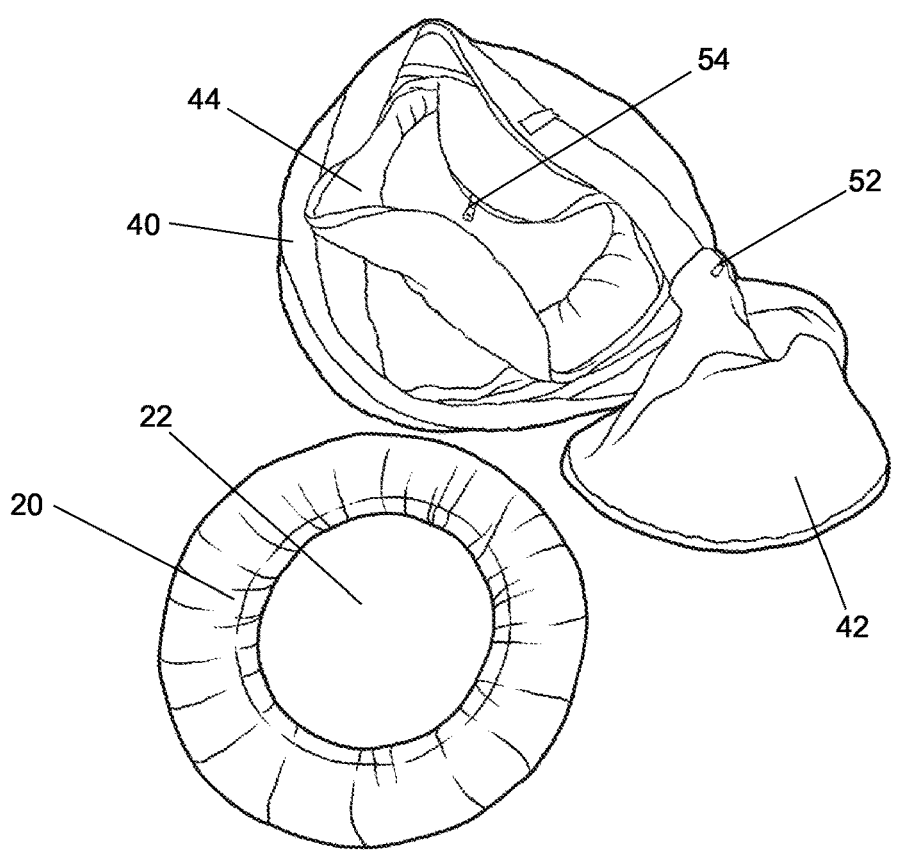
FIG. 7 is a top view of the bed of FIG. 1 having the top cushion being separated from the cover.
Figure 8:
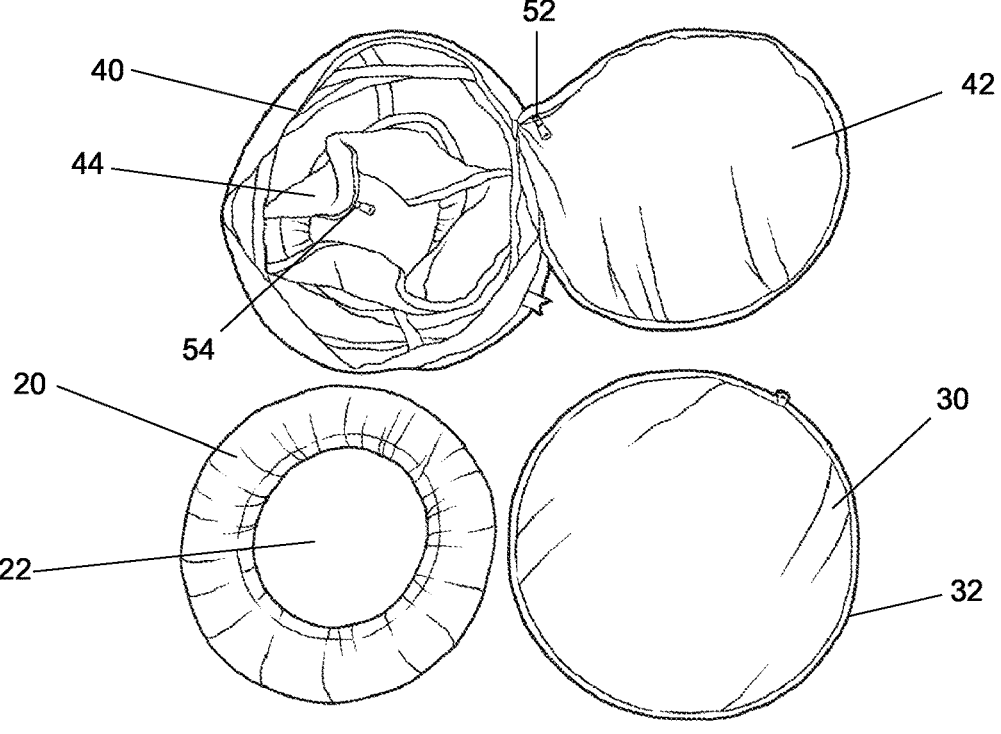
FIG. 8 is a top view of the bed of FIG. 1 having the base cushion and top cushion separated from the cover.

FIGS. 1 and 8 illustrates the bed 10 having a top cushion 20 and a base cushion 30 retained within a cover 40. The cover 40 comprises a flap 42 which closes the cover 40 such that the top cushion 40 and the base cushion 30 may be retained therewithin. As best seen in the transition between FIGS. 4 to 6, the cover 40 comprises an internal partition 44 for further separating the top cushion 20 and the base cushion 30 when retained within the cover 40.

In the preferred embodiment, the top cushion 20 comprises a passage 22 therethrough. As seen best in FIG. 6, when the top cushion 20 is inserted into the cover 40, the passage 20 of the top cushion 20 aligns with the internal partition 44. The internal partition 44 passes through the passage 22 of the top cushion 20 and may be extended to lay across the top cushion 20. The internal partition 44 may be fastened or otherwise secured to an internal surface of the cover 40. The passing of the internal partition 44 through the passage 22 of the top cushion 20 and fastening or securing to the internal surface of the cover 40 secures the top cushion 20 within the cover 40. Preferably, the engagement of the top cushion 20 between the cover 40 and the internal partition 44 centrally and coaxially locates the top cushion 20 within the cover and eventually with the base cushion 30 when installed. Preferably, the top cushion 20 when secured within the cover has a snug fit. The engagement of the top cushion 20 with the cover 40 preferably defines a nest 12 (as seen in FIG. 1) for receiving a pet.

The nest 12 is defined by the top cushion 20 which in the preferred embodiment, is substantially toroidal. Accordingly, when the cover 40 is laid out or stretched over the top cushion 20, the cover 40 dips into the central region of toroid providing the nest. Advantageously, the top cushion 20 comprises a memory foam coupled to a core cushion. The memory foam may be rolled around all or a portion of the core cushion. The memory foam may be coupled by a number of means including but not limited to adhesives, fasteners, straps, etc. The top cushion 20 is preferably retained within a sleeve. The sleeve may be removable and/or waterproof. These features assist in the ability to clean and disassemble/reassemble the pet bed 10. The sleeve may comprise a more permeable material in comparison to the covers discussed in detail below. The main purpose of the sleeve is to retain the top cushion 20 in its intended shape and configuration. The sleeve ensures the top cushion 20 retains its toroidal shape. As such, there is no additional adjustments required to provide such a shape to the pet bed. Furthermore, as the top cushion 20 is retained within a sleeve and comprises a fixed construction, it is easier to manage when removing and reinstalling within the cover. No further adjustments to the top cushion 20 are required to give it the original shape. In other pet beds, these types of cushions are merely sleeves stuffed with smaller bits of foam or poorly cut pieces of cushioning. Accordingly, when trying to reassembly the respective pet beds, it can be difficult to achieve the original shape and/or to fit within the cover in the same manner as it was removed.

In the preferred embodiment, the top cushion 20 and the base cushion 30 are retained in position through a plurality of zipper assemblies 52, 54. While the person skilled in the art would readily appreciate that there are many ways in which the flap 42 and the internal partition 44 may be connected to the cover 40 such as by hook and loop fastener or buttons, the preferred embodiment utilises zipper assembly 52, 54. The opening is sufficient for separating and reinstalling each of the top cushion 20 and the base cushion 30. The cover 40 comprises an opening having a flap 42 which complements the size and shape of the opening. The opening and the flap 42 comprise complementary elements of a zipper assembly 52. The elements of the zipper assembly 52 are positioned around a periphery of each of the opening and the flap 42. A slider of the zipper assembly 52 is used in a known manner to combine the elements to fasten the flap 42 to the cover 40. The cover 40 further comprises additional elements of a zipper assembly 54 which are complementary to elements on a periphery of one end of the internal partition 44. As the internal partition 44 must pass through the passage 22 of the top cushion 20, the elements of the zipper assembly 54 are placed substantially the circumference of each of the internal partition 44 and an internal surface of the cover 40. The zipper assembly 54 further comprises a slider for combining the elements on the internal partition 44 and the cover 40.

The pet bed 10 may comprise a combination of materials which seek to provide practicality as well as comfort. In some embodiments, the cover 40 and the internal partition 44 may comprise the same material, such as canvas, synthetic fibres, polyester boucle etc. Alternatively, the cover 40 and the internal partition 44 may comprise different materials. The purpose of the cover 40 is largely to protect the top cushion 20 and the base cushion 30 whereas the internal partition 44 is mainly to keep the top cushion 20 in a particular orientation and location within the cover 40. Accordingly, the cover 40 may comprise a more robust material while the internal partition 44 comprises a material which does not have the same properties. This is ultimately a manufacturing and cost of material question and may differ based on the location of which the pet bed is made. For example, as pets sometimes enjoy water, the cover 40 may benefit from being made of a waterproof or at least water resistant material. In order to avoid requiring separate material and/or case of manufacturing, the internal partition may also be waterproof or water resistant. Alternatively, or in combination, the cover 40 and the internal partition 44 may comprise an absorbent material such that when the pet lays in the bed 10, the bed 10 can absorb some of the water. Preferably, the cover 40 is of a construction which is suitable for washing in a washing machine.

In some embodiments, the base cushion 30 and/or the top cushion 20 may comprise a sleeve or secondary cover. This may assist in increasing the lifetime of each of the base cushion 30 and the top cushion 20. This may also assist in keeping the top cushion 20 and the base cushion 30 clean while the cover 40 is being cleaned. The sleeves or secondary covers may provide a surface which can be more easily cleaned, such as a waterproof or at least water resistant materials, without sacrificing the comfort provided by each of the base cushion 30 and the top cushion 20. Furthermore, the sleeves or secondary covers may be replaceable to assist in maximising the lifespan of the top cushion 20 and the base cushion 30.

The method of assembling/disassembling the pet bed 10 will now be discussed with respect to the Figures generally. The process of disassembling the bed 10 is broadly shown in sequence between FIG. 1 to FIG. 8. The process of assembling the bed 10 is broadly shown in sequence between FIG. 8 to FIG. 1.

To disassemble the pet bed 10 starting from FIG. 1, the pet bed 10 is flipped so as to provide a user with access to the zipper assembly 52. The zipper assembly is unzipped so as to separate the flap 42 from the cover 40. In some embodiments, the flap 42 may be a completely separate piece of material which is fastened to the cover 40, for example by a zipper assembly 52. However, in the preferred embodiment, the flap 42 forms part of the cover 40 and is permanently connected about a portion of the periphery of the opening in the cover 40. Once the flap 42 has been unfastened from the cover 40, the base cushion 30 is exposed. The base cushion 30 may be removed from the cover 40. Next, the zipper assembly 54 is unzipped so as to unfasten an end of the internal partition 44 from the internal surface of the cover 40. The internal partition 44 is moved into the passage 22 of the top cushion 22 such that the top cushion 22 may now be removed from the cover 40. As mentioned above, in the preferred embodiment, the internal partition 44 is permanently affixed to the cover 40. However, in some alternative embodiments, the internal partition may be separable from the cover 40.

To assemble the pet bed 10, the top cushion 20 is located such that the internal partition 44 is substantially within the passage 22 of the top cushion 20. The internal partition 44 is then pulled through the passage 22 of the top cushion 20 and laid out over the top cushion 20 such that an edge of the internal partition 44 is adjacent a periphery of an internal surface of the cover 40. The internal partition 44 is fastened to the internal surface of the cover 40. In the preferred embodiment, the fastening is by way of the zipper assembly 54. The fastening of the internal partition 44 to the cover 40 ensures the top cushion 20 is centrally located and snugly fit within the cover 40. Next, the base cushion 30 is located within the cover 40 and substantially concentric with the top cushion 20. Preferably, the top cushion 20 and the base cushion 30 are circular such that locating them within the cover 40 will to some extent be guided by the cover 40 itself. Once the base cushion 30 is within the cover 40, the flap 42 can be fastened to the cover 40, such as by the zipper assembly 52. The bed 10 may then be rotated and set such that the base cushion 10 abuts the surface which the bed 10 will rest and the top cushion 22 will present to the pet for receiving the pet.

The present invention is advantageous as its construction provides a modular style pet bed 10 which ensures that even when the bed 10 requires cleaning, the assembly/reassembly process is easy and results in the bed retaining its original shape. The configuration of the top cushion is also a novel feature in that other applications traditionally require additional manipulation of the contents of the cushions to ensure the bed can be reassembled as prior to disassembling.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

What is claimed is:
1. A bed for a pet, the bed comprising:
a base cushion and a top cushion releasably retained within a cover, the cover having an internal partition for separating the base cushion and the top cushion, the top cushion positioned on an upper surface of the base cushion such that an external periphery of the bed is formed from sides of the base cushion and the top cushion, the top cushion formed as a single unit forming a loop;

wherein the top cushion comprises a passage therethrough for receiving the internal partition which attaches to a periphery of an internal surface of the cover thereby locating the top cushion centrally and coaxially with the base cushion within the cover, wherein access to a mechanism for unattaching the internal partition from the periphery of the internal surface of the cover is provided after opening a flap and separating the base cushion from the top cushion.

2. The bed according to claim 1, wherein the top cushion comprises a memory foam coupled to a core cushion within a sleeve.

3. The bed according to claim 1, wherein the top cushion is substantially toroidal.

4. The bed according to claim 1, wherein the engagement of the top cushion and the cover defines a nest for receiving a pet.

5. The bed according to claim 1, wherein the cover comprises one or more zipper assemblies for retaining each of the top cushion and the base cushion in their respective positions.

6. The bed according to claim 5, wherein the one or more zipper assemblies are associated with the cover and a flap of the cover.

7. The bed according to claim 1, wherein the cover and the internal partition comprise the same material.

8. The bed according to claim 1, wherein the cover and the internal partition comprise different materials.

9. The bed according to claim 1, wherein the cover and/or the internal partition comprise a water resistant or waterproof material.

10. The bed according to claim 1, wherein the cover and/or the internal partition comprise an absorbent material.

11. The bed according to claim 1, wherein the base cushion and/or the top cushion comprises a secondary cover.

12. The bed according to claim 11, wherein the secondary cover comprises a water resistant or waterproof material.

13. A method of assembling the bed of claim 1, the method comprising:
locating the top cushion within the cover such that the internal partition is positioned within the passage;
pulling an end of the internal partition through the passage and laying the end of the internal partition adjacent a periphery of an internal surface of the cover;
fastening the end of the internal partition to the periphery of the internal surface of the cover;
locating the base cushion within the cover abutting the internal partition; and
fastening the flap of the cover to the cover so as to retain the base cushion and top cushion therein.

14. The method according to claim 13 further comprising fastening the partition comprises engagement of one or more zipper assemblies.

15. The method according to claim 13 further comprising fastening the flap comprises engagement of one or more zipper assemblies.

16. A method of disassembling the bed of claim 1, the method comprising:
unfastening the flap of the cover to expose the base cushion;
separating the base cushion from the cover;
unfastening the internal partition from an internal surface of the cover to expose the top cushion; and
separating the top cushion from the cover.

17. The method according to claim 16 further comprising unfastening the partition by disengagement of one or more zipper assemblies.

18. The method according to claim 16 further comprising unfastening the flap by disengagement of one or more zipper assemblies.

\* \* \* \* \*